United States Patent [19]

Grauel et al.

[11] Patent Number: 5,088,094
[45] Date of Patent: *Feb. 11, 1992

[54] ACCESSING OF TRANSMISSION CHANNELS OF A COMMUNICATION SYSTEM

[75] Inventors: Christoph Grauel, Feucht; Werner Schmidt, Heroldsberg, both of Fed. Rep. of Germany

[73] Assignee: Philips Kommunikations Industrie Aktiengesellschaft, Nuremberg, Fed. Rep. of Germany

[*] Notice: The portion of the term of this patent subsequent to Mar. 21, 2006 has been disclaimed.

[21] Appl. No.: 407,691

[22] Filed: Aug. 12, 1982

[30] Foreign Application Priority Data

Aug. 22, 1981 [DE] Fed. Rep. of Germany ....... 3133347

[51] Int. Cl.⁵ ................................. H04J 3/16
[52] U.S. Cl. ...................... 370/95.1; 455/33; 379/60
[58] Field of Search ........... 370/95, 93; 455/33, 455/34, 53, 54, 55, 56; 379/60

[56] References Cited

U.S. PATENT DOCUMENTS

| | | |
|---|---|---|
| 3,634,627 | 1/1972 | Velentini .................... 370/95 |
| 3,639,904 | 2/1972 | Arulpragasam ............. 370/89 |
| 3,646,274 | 2/1972 | Nadir et al. ................ 370/95 |
| 3,680,056 | 7/1972 | Kropfl ....................... 370/89 |
| 3,790,717 | 2/1974 | Abramson et al. ......... 370/89 |
| 4,096,355 | 6/1978 | Rothauser et al. ......... 370/93 |
| 4,356,484 | 10/1982 | Eckhardt ................... 370/95 |
| 4,414,661 | 11/1983 | Karlstrom .................. 370/95 |

*Primary Examiner*—Douglas W. Olms
*Assistant Examiner*—Wellington Chin
*Attorney, Agent, or Firm*—Horst M. Kasper

[57] ABSTRACT

In a communications system with a plurality of subscriber stations independent from each other, where each subscriber station can access according to a multiple access method a joint duplex transmission channel, the probability becomes very large for simultaneous attempts to get access and thereby the probability of signal destruction becomes particularly large. In order to avoid a blockage of the service channel each subscriber station occupies the duplex transmission channel with a short access signal for initiating a transmission starting with the subscriber station. The subscriber station characterized by the position in time and/or the information contents of the signalling short designation call is thereupon invited by the central base station to provide complete identification information.

21 Claims, 4 Drawing Sheets

ACCESSING OF TRANSMISSION CHANNELS OF A COMMUNICATION SYSTEM

BACKGROUND OF THE INVENTION

1. Field of the Invention

The present invention relates to a method and to a system for accessing of transmission channels of a communication system with at least a central base station, with at least a duplex transmission channel and with a plurality of subscriber stations independent of each other, where each subscriber station can have access to the duplex transmission channel according to a multiple access method.

2. Brief Description of the Background of the Invention Including Prior Art

A system for transmission of messages via radio communication can be recited as an example for such a communication system. A radio transmission system is known from German Patent Application Laid Open DE-OS 2,537,683 having stationary radio stations and mobile subscriber stations. There to each stationary radio station (central base station) is assigned a set of duplex transmission channels. One of the channels, the control channel, is employed for the transmission of control information for system operation and the other channels (the voice channels) are employed for voice communication. In the following, the transmission direction from the subscriber station to the central base station is called forward direction and the reverse transmission direction is called backward direction. The principles of operation of various channel access methods are taught in German Patent Application Laid Open DE-OS 2,537,683.

At the start of each transmission from a subscriber station to the central base station initially an identification of the own mobile station is transmitted in forward direction via the control channel (duplex transmission channel). If two or more subscriber stations emit their identification at the same time onto the control channel, then none of these identifications can be recognized in the central base station except for the special case, where one of the identifications is received with a substantially larger power as compared with all the others.

With increasing number of subscriber stations also the probability increases that more than one of the subscriber stations intend to access the control channel at the same time. Since the control channel is to be used by all subscriber stations jointly, the probability for access attempts at the same time to the control channel and therewith the probability of destruction of the signals are particularly large.

A further increase in the probability of destruction results from the repetition of attempts of accessing based on not recognized identifications. Upon each destruction of an access the transmission channel is not useable at least for the duration of an identification, that means blocked. The portion of time the control channel is blocked due to access destructions increases additionally with the length of the identification, that is with the number of the subscriber stations to be admitted to the complete communications system.

In case of short and frequent transmissions the capacity of the duplex transmission channel can only be utilized to a small part.

Joel, Jr. teaches in U.S. Pat. No. 3,663,762 a mobile communication system where an electronic processor is incorporated. The system comprises a plurality of base stations each located in individual cell areas. Predetermined cell areas are periodically interrogated to detect movement of located mobile stations into new areas.

Wells et. al. in U.S. Pat. No. 3,898,390 teach a mobile radio communication system and a method for increasing the effective use of communication channels in a small zone communication system. Calls between two mobile units may be routed through a central control terminal and base stations. The mobile units may all search for and lock onto an appropriate control signal channel. A call is initiated over a base station control signal channel and the control and signalling link connecting the base station to the control terminal. An available one of the voice channels assigned to the base station through which the call is established is then assigned to the call. In the event that the call was originated by a mobile unit and a call back is requested, the central processing unit may store the call until circuits are clear and then notify the mobile unit of the availability of circuits at a later time (column 7, lines 59 to 63).

SUMMARY OF THE INVENTION

Purposes of the Invention

It is an objective of the present invention to provide a method for giving access to transmission channels of a communication system of the kind initially mentioned such that the utilization of a duplex transmission channel is increased.

It is a further objective of the invention to avoid scrambling of access attempts transmitted by different subscriber stations to a central base station at about the same point in time.

It is another objective of the present invention to provide a communication system where the central base station coordinates two way transmission to the subscriber station to the maximum extent.

These and other objectives and advantages of the present invention will become evident from the description which follows.

Brief Description of the Invention

The present invention provides a method for accessing of transmission channels in a communication system with at least a duplex transmission channel and a plurality of independent subscriber stations. A short access signal originates at a subscriber station for engaging a duplex transmission channel for initiating a call from the subscriber station. The central base station responds to the accessing subscriber station with a request for complete identification thereby initiating an information transmission from and to the subscriber station. Each subscriber station can access the duplex transmission channel according to a multiple access method.

An access signal is shorter than a signal required for a complete identification. The complete identification signal is in general specified for transmission systems in so-called performance specs, which delineate for example the time interval of a complete information message.

The position in time of the access signal can be employed as a characteristic of the subscriber station by the central base station. Alternatively or in addition the kind of the access signal can be employed as a characteristic of the subscriber station by the central base station. The received signal quality of the access signal can be determined by the central base station and a request for complete identification can be emitted by the central base station depending on the received signal quality.

Therefore, several ways are provided whereby the central base station after receipt of the access signal requests the concerned subscriber station to provide complete identification. For this purpose both at the central base station as well as at the participating subscriber station a known feature of the access signal has to be employed. This feature serves in the central base station for distinguishing between subscriber stations, which have accessed in fact during a certain time interval with access signal and thus show that they desire communication transmission. The probability of access destructions as well as the part of time, during which the duplex transmission channel is blocked due to collisions, is decreased by shortening of the duration of the access signal. Thus the utilization of the transmission channel for useful information transmission is substantially increased.

The employing of the position in time or of the kind of the access signal or of both for partial subscriber station recognition can reduce the effects of nevertheless occuring simultaneous access attempts or of interferences present on the transmission channel and imitated access attempts. The subscriber stations in each case can select one of several different access signals. The request for identification by the central base station can also indicate the kind of the access signal employed by the subscriber station at the attempted access.

A further improvement of channel use results if the central base station emits a request for identification only in those cases, where an access signal with sufficient receiving quality was recognized. By way of this recognizing and separating of access disturbances and imitations as well as of access attempts at low reception quality no time intervals of the duplex transmission channel are kept open for calls which anyway result in unsuccessful identifications.

In addition the utilization of the access-blocked time intervals (times during which the free access is blocked for other subscriber stations), is increased if the subscriber station invited for identification uses the time provided for this purpose as good as possible. A subscriber station needs a certain reaction time, for example in order to evaluate the request for identification, before it is ready to emit an identification. A fixed delay period for each information transmission in the direction towards the central base station can be provided versus the information transmission in the direction to the subscriber stations. Instead of using a fixed delay, the delay for each information transmission in the direction to the central base station versus the transmission to the subscriber stations may be determined on a case by case basis by the central base station and the delay period may be communicated to the subscriber stations.

Possible embodiments are set forth in the following for purposes of coordination in order to increase traffic throughput. The duplex transmission channel can be subdivided into time intervals either permitted or blocked for free access. Those time intervals, where free access is blocked, can be used for complete identification by the subscriber station after receiving of the request for complete identification, as well as for additional information transmission. Markings can be emitted from the central base station to the subscriber stations, which determine during which time intervals the subscriber stations can access the duplex transmission channel with access signals. Accordingly, a transmission channel is employed both for access of the subscriber stations during time intervals permitting free access as well as for transmission of useful information during time intervals blocked for free access. The subscriber station can be informed of a transmission channel blocked from free access, which channel is employed both by the subscriber station after receipt of the request for complete identification for emitting the complete identification as well as for further information transmission. Therefore, a destruction of the use information caused by free access of other subscriber stations is completely avoided according to the method set forth.

The probability of mutual destruction of access signals is smaller, if during times permitting access the accessing attempts occur as uniformly distributed as possible. The exact point in time within a time interval permitting the access with access signals can be selected according to an algorithm or at random for starting of the emission of an access signal of the subscriber station for the initiation of a connection starting at the subscriber station. Thus a subscriber station does not necessarily access immediately after receiving permission to access. For example, the exact point in time for emitting of the signalling short designation call is selected at random.

A simple realization of the course of processes in the subscriber station results if the duplex transmission channel is subdivided in forward and backward direction into time slots of equal length. In particular, the time intervals during which the subscriber stations can access with access signals can be subdivided into call slots, the time duration of which having a fixed ratio to the time duration of the access signals. Thus each time slot permissible for free access is subdivided into a number of short so-called call slots, where the time duration of a call slot corresponds at least to the time duration of an access signal, which is equal for all subscriber stations. Thus preferably all the access signals employed by the subscriber station are of the same time duration. Furthermore, the duplex channel is preferably subdivided in each transmission direction into a sequence of time slots.

The request for complete identification information to a subscriber station, which has called with an access signal, can be incorporated into a desired transmission emitted by the central base station. Thus there exists the possibility to provide a time interval in some or all transmissions of the central base station, in particular those to a certain (already previously identified) subscriber station. This time interval can be employed for an identification request to another subscriber station, which had accessed with an access signal. Instead of such an identification request in the time interval provided in a message also a marking can be entered by the central base station, which provides either free access or blocking and thus determines during which time intervals the subscriber stations can access the duplex transmission channel.

A burst error correcting code can be employed for the identification and for further transmission, with which an error burst generated during the transmission by emitting of a signalling short designation call can be corrected. Thereby a destruction of the useful information through free access of other subscriber stations is substantially avoided.

There is provided according to a further aspect of the invention a system for establishing communication transmission between subscriber stations and a central base station which comprises a subscriber station emitting access signals to the central base station for initiating information transmission of the subscriber station via a duplex transmission channel and the central base station receiving the access signal and responding with a request for complete identification of the subscriber station thereby initiating an information transmission from and to the subscriber station.

A delay means can be provided for giving a fixed delay period for each transmission in the direction to the central base station versus the information transmission in the direction of the subscriber stations. A blocking means can be provided for subdividing the duplex transmission channel into time intervals permissible and, respectively, blocked for free access from the subscriber stations.

The method of the present invention provides the advantage that the free access of a subscriber station to the duplex transmission channel is performed not with a complete identification, but with a substantially shorter signal. This access signal informs the central base station only that a transmission request exists coming from any subscriber station. The complete and unequivocal identification of this subscriber station can then be performed as well as possible the transmission of other use information at a later point in time at the same or at another transmission channel under coordination through the central base station such as for example the formation of waiting queues.

The novel features which are considered as characteristic for the invention are set forth in particular in the appended claims. The invention itself, however, both as to its system and its method of operation, together with additional objectives and advantages thereof, will be best understood from the following description of specific embodiments when read in connection with the accompanying drawing.

BRIEF DESCRIPTION OF THE DRAWING

In the accompanying drawing are shown two embodiments of the invention as applied to a radio telephone service.

DESCRIPTION OF INVENTION AND PREFERRED EMBODIMENTS

In accordance with the present invention, the stationary radio telephone stations the central base stations are spacially arranged according to a cell system. A number of duplex transmission channels also called radio channels are assigned to each stationary radio telephone station and thereby to each radio zone. At least one of the channels, the control channel, is employed for signalling of control commands for controlling system operation. Part of this is for example the transmission of dialling information for the connection of lines from and to the mobile subscriber stations as well as identification messages of the mobile subscriber stations for providing information as to their reachability. The invention method and system applies to this control channel in order to be able to serve a number as large as possible of mobile subscriber stations without the appropriation of additional control channels, in order to save radio channels and thus make a contribution to spectrum efficiency.

Figure 1:
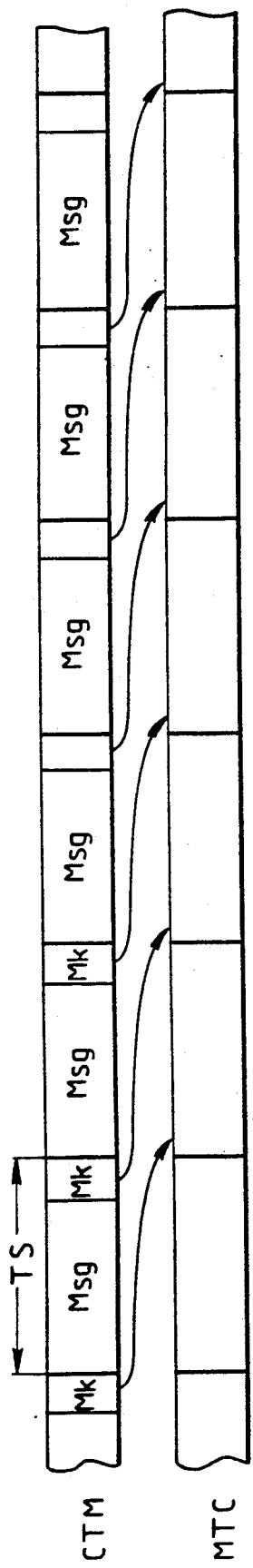
FIG. 1 is a view of a schematic diagram showing the organization of a transmission channel.

As is shown in FIG. 1, each control channel is subdivided in each transmission direction into a sequence of equal length time slots. To each time slot TS in backward direction CTM (from the central base station to the mobile subscriber station) is fixedly coordinated the time slot after the next in forward direction MTC (from the mobile subscriber station to the central base station). This is indicated in FIG. 1 by way of lines with arrows. A corresponding coordination between forward direction MTC and backward direction CTM is not provided. The central base station emits continuously messages Msg with constant time duration in the backward direction, which corresponds to a time slot TS. Each message Msg of the backward direction CTM comprises a marking Mk, which informs about the intended use of the coordinated time slot TS in the forward direction MTC. The marking Mk can have one of the following three meanings:

Per = Permission for free access from mobile subscriber stations by means of access signals during the coordinated time slot.

Bl = Blocking of the coordinated time slot TS for free access.

XY = Request for complete identification during the coordinated time slot for that subscriber station, which had accessed with that access signal characterized by XY. This implies an access blockage for all other mobile subscriber stations.

Each time slot TS permissible for free access is subdivided by fixing within the system into a certain number of for example eight call slots. In addition, a uniform duration of the access signal as a fixed system parameter is known to all mobile subscriber stations.

Figure 2:
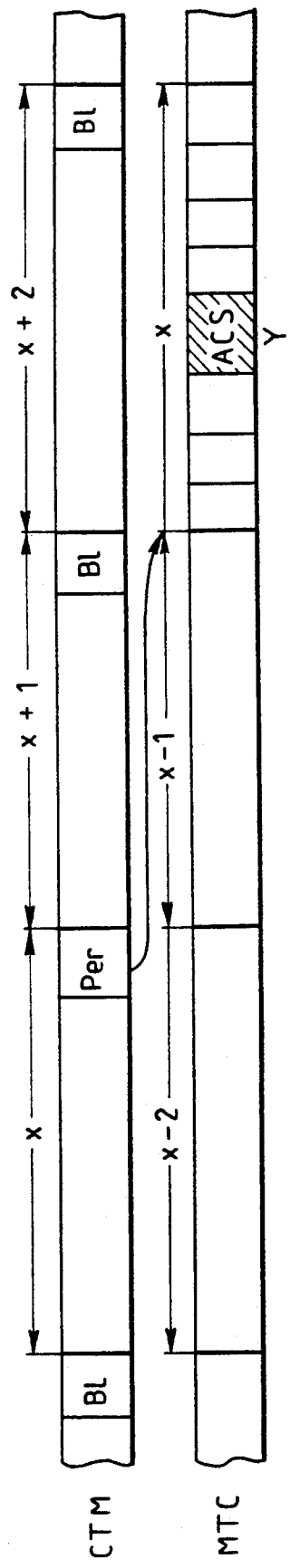
FIG. 2 is a view of a schematic diagram showing the course of an access onto the service channel.

FIG. 2 shows the course of an access procedure onto the service channel. If a mobile subscriber station desires to access the control channel, it waits initially for a free access permission Per to the time slot TS in the forward direction MTC coordinated (as indicated by way of lines with arrow heads) to the free access permission. This time slot be designated as X and is according to convention subdivided into for example eight call slots. The mobile subscriber station selects at random one of these call slots designated in the following as Y and emits its access signal during that call slot. This comprises for example a bit pattern uniform for all mobile subscriber stations and therefore does not offer any possibility of distinction. The time position of the signalling short designation call characterized by the pair of values XY is known to both the mobile subscriber station as well as to the central base station. The request for complete identification now comprises the indication of XY as a marking with the meaning already explained. The time slot fixedly coordinated to this marking is available solely to the invited mobile subscriber station in order to emit a message ID(XY) with its complete identification as well as the kind of the dialog desired with the stationary radio telephone station.

Figure 3A:
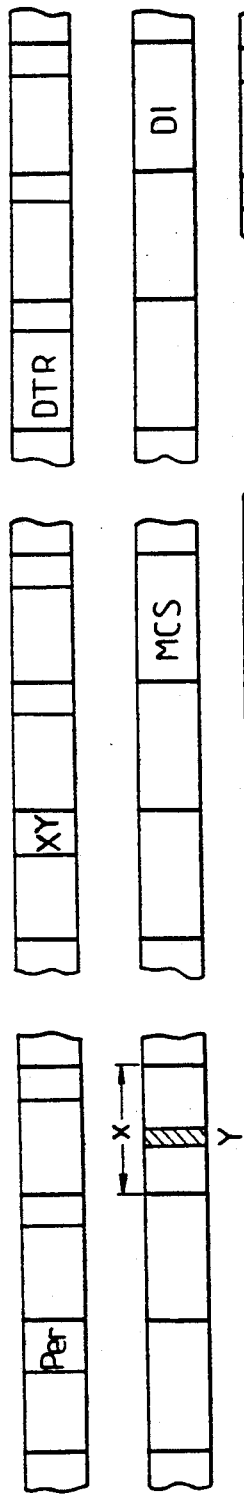
FIG. 3a is a view of a schematic diagram showing the dialog between subscriber station and central base station at the initiation of a communication.
Figure 3B:
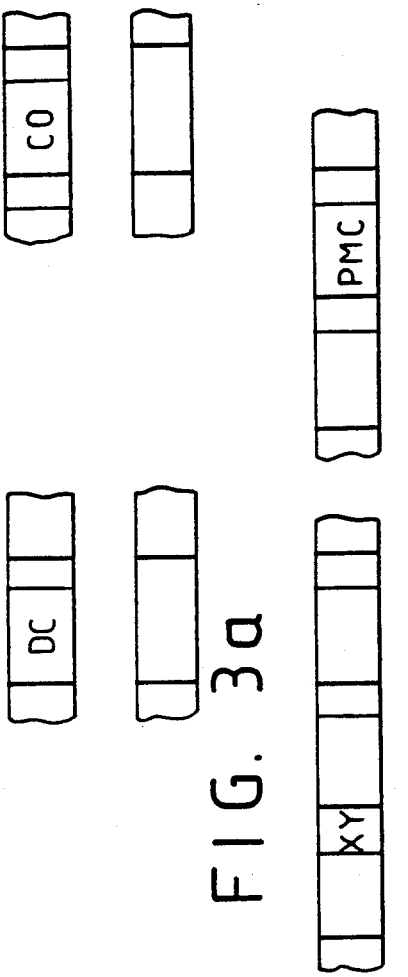
FIG. 3b is a view of a schematic diagram showing the dialog between subscriber station and central base station used for indicating the presence of the subscriber station.
Figure 3C:
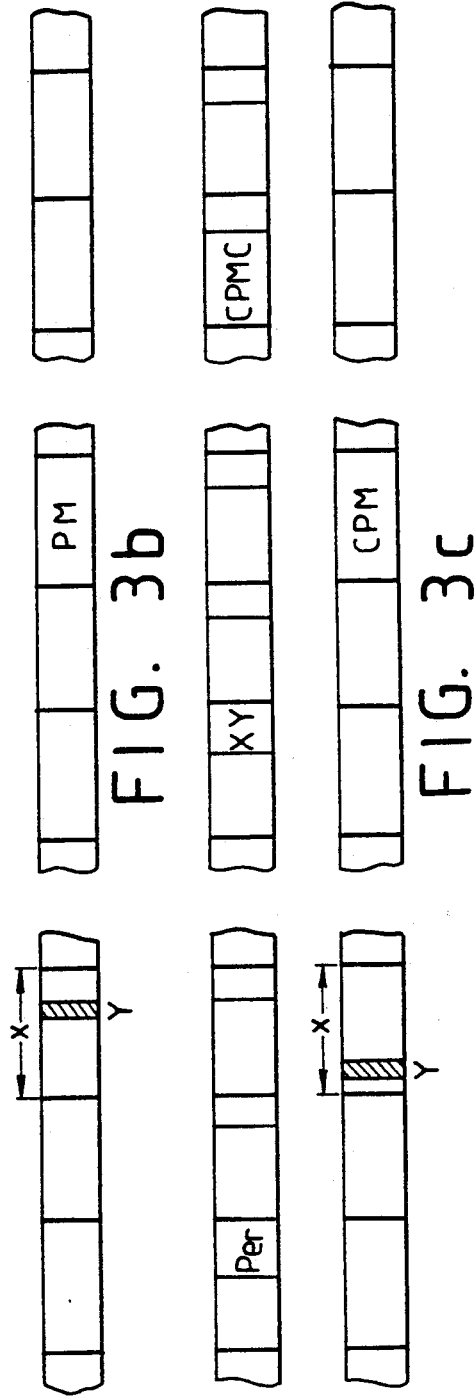
FIG. 3c is a view of a schematic diagram showing the dialog between subscriber station and central base station upon change of position of the subscriber station.

Various kinds of dialogs are illustrated in FIGS. 3a, 3b, and 3c. For example as kinds of dialog can be provided:

1. Setup of a call from a mobile subscriber station to a fixed subscriber of the telephone network (FIG. 3a), 2. Indication of presence upon readiness for operation of the mobile subscriber station (FIG. 3b), and 3. Change notice upon transition from one radio telephone zone into another radio telephone zone (FIG. 3c).

Each of these dialogs comprises at least two messages and can be constructed as is described in the following.

1. Set up of Connection

After receiving the identification request, which is designated as XY in FIG. 3a, the mobile subscriber station emits in forward direction MTC a mobile call set-up message MCS containing its complete identification as well as the indication, that it is interested in establishing a voice link. After a certain time the central base station confirms the identification and requests by emitting the message DTR (ref. to FIG. 3a), the mobile subscriber station to transmit a dialling information. Thereupon during the time slot after the next the mobile subscriber station performs the transmission of a dialling information DI. The central base station confirms the dialling information with a dialling confirmation DC and starts with providing the desired connection. If the called subscriber responds, the central base station emits a channel order CO which refers to a voice channel provided for the voice connection.

2. Indication of Presence

Upon switching on or during certain time intervals during the readiness for operation, the mobile subscriber station informs the central base station that it is accessible for calls in that radio zone. After performed access to the control channel and the request for complete identification the mobile subscriber station emits a presence message PM, containing the complete identification. This message PM is confirmed by the stationary radio telephone station with a confirmation PMC, whereby the dialog is terminated.

3. Change of Location

If a mobile subscriber station changes the radio zone, it has to inform that central base station, into the area of which the mobile subscriber station moves, about the change in radio zone such that the subscriber station remains within reach of the radio telephone service. The necessary dialog corresponds to the presence communication (2.), where the messages PM are replaced by change messages CPM and the messages PMC are replaced by a change message confirmation CPMC. The largest part of the time is taken by the identification in the messages MCS, PM, CPM based on the large number of mobile subscriber stations to be admitted to the system. In comparison with this the information required for the distinction of the dialogs is relatively minor. In addition to the recited messages DTR, DC, CO, PMC, CPMC there exist in the backward direction CTM additional messages for other system functions. These system functions are not to be distinguished here further and are designated in the FIGS. 1 to 4 as Msg.

Figure 4:
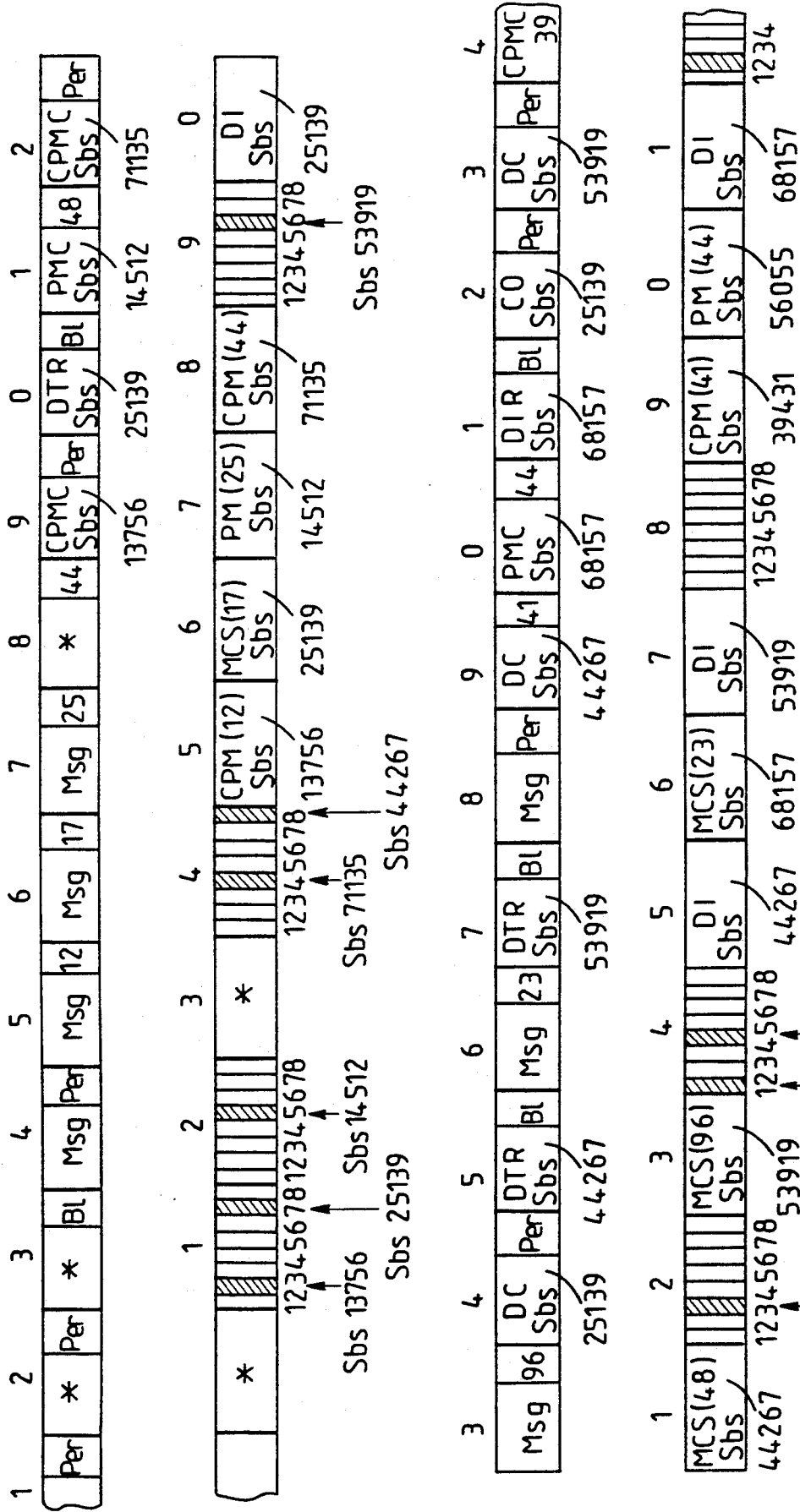
FIG. 4 is a view of a schematic diagram representing a time section (duration) of the control channel with various dialogs according to the invention.

A time section of the control channel with various dialogs is shown in FIG. 4. The various dialogs are performed with several mobile subscriber stations Sbs interlaced in time. The time slots represented with a * represent parts of dialogs, which were started before the beginning of the time section shown in FIG. 4. The numbering of the time slots is cyclically provided with the numbers 0 to 9. The request XY for complete identification therefore comprises two figures. The first figure X designates the number of the time slot, the second number Y designates the number of the call slot (in the time slot X), during which the access signal was emitted. With respect to realization it can be more advantageous in contrast to this simplified representation to provide with the number X the number of the time slots passed since the emission of the access signal. It can be recognized from FIG. 4 that the time blocked for free access can be completely used for the transmission of use information messages, only a relatively small part of the capacity of the service channel has to be made available for free access, however only a small part of the available call slots are occupied with access signals, from which only a small probability of destruction results, and therefore in total the invention method provides a high loading and use of the control channel combined with a low probability of access disturbances.

Figure 5:
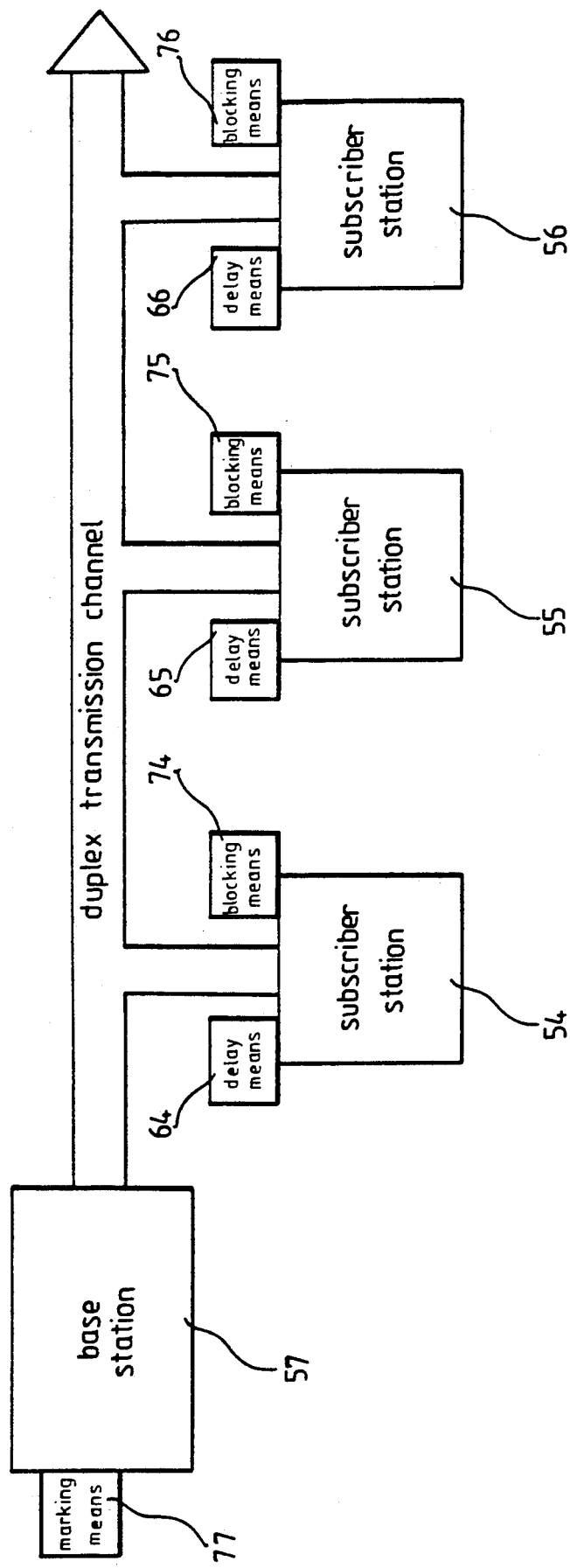
FIG. 5 is a view of a schematic diagram of a system for controlled access communications according to the present invention.

Referring now to FIG. 5 there is shown an embodiment with a system for establishing comunication transmission between subscriber stations 54, 55, 56 served by a central base station 57. A duplex transmission channel 51 provides a connection between the central base station and the respective subscriber stations 54, 55, 56. The subscriber station 54, 55, or 56 emits an access signal to the central base station for initiating a call of the subscriber station via the duplex transmission channel. The central base station 57 receives the access signal and responds with a request for complete identification of the subscriber station thereby initiating an information transmission from and to the respective subscriber station.

A delay means 64, 65, 66 provides a fixed delay for each transmission in the direction to the central base station 57 versus the information in the direction of the subscriber stations. Also, a blocking means 74, 75, 76 can be provided for subdividing the duplex transmission channel into time intervals permissible and time intervals blocked to free access from the subscriber stations.

A marking means 77 is shown in FIG. 5 disposed at the central base station for generating and emitting marking signals which set times with allowed access to the duplex transmission channel with access signals originating from the subscriber stations.

The invention method and system provide furthermore a series of advantages for the realization of control procedures in particular in the case of mobile subscriber stations.

It will be understood that each of the elements described above, or two or more together, may also find a useful application in other types of system configurations and telephone and communication switching procedures differing from the types described above.

While the invention has been illustrated and described as embodied in the context of a mobile radio telephone communication system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

1. A method for accessing of transmission channels in a communication system with at least a central base station at least a duplex transmission channel and a plurality of independent subscriber stations comprising originating at a subscriber station a short access signal, carrying call request information amounting to less than a complete identification of the subscriber station, engaging a duplex transmission channel for initiating an information transmission from the subscriber station; responding of the central base station with a request for complete identification to that subscriber station characterized by its short access signal thereby initiating an information transmission from and to that subscriber station.

2. The method for accessing of transmission channels according to claim 1 wherein each subscriber station can access the duplex transmission channel according to a multiple access method.

3. The method for accessing of transmission channels according to claim 1 further comprising employing the position in time of the short access signal as a characteristic of the subscriber station by the central base station.

4. The method for accessing of transmission channels according to claim 1 further comprising employing the kind of the short access signal as a characteristic of the subscriber station by the central base station.

5. The method for accessing of transmission channels according to claim 1 further comprising determining the received signal quality of the short access signal by the central base station; and emitting a request for complete identification by the central base station depending on the received signal quality.

6. The method for accessing of transmission channels according to claim 1 further comprising providing a fixed delay for each information transmission in the direction toward the central base station versus the information transmission in the direction towards the subscriber stations.

7. The method for accessing of transmission channels according to claim 1 providing a delay for each information transmission in the direction towards the central base station versus the information transmission in the direction towards the subscriber stations determined on a case by case basis by the central base station; and communicating the delay to the subscriber stations.

8. The method for accessing of transmission channels according to claim 1 further comprising subdividing the duplex transmission channel into time intervals permitting or blocking free access; and performing the complete identification by the subscriber station after receiving of the request for complete identification as well as additional information transmission only during the time intervals blocking free access.

9. The method for accessing transmission channels according to claim 1 further comprising emitting of markings from the central base station to the subscriber stations, which determine during which time intervals the subscriber stations can access the duplex transmission channel with short access signals.

10. The method for accessing of transmission channels according to claim 1 further comprising blocked for free access, which channel is employed both indentification informing the subscriber station of a transmission channel for emitting of the complete by the subscriber station after receipt of the request for complete identification as well as for further information transmission.

11. The method of accessing of transmission channels according to claim 1 further comprising selecting by the subscriber station according to a defined algorithm the exact point in time within a time interval permitting access for starting the emission of a short access signal in order to initiate an information transmission to the central base station.

12. The method for accessing of transmission channels according to claim 1 further comprising selecting by the subscriber station at random the exact point in time within a time interval permitting access for starting the emission of a short access signal in order to initiate an information transmission to the central base station.

13. The method for accessing of transmission channels according to claim 1 further comprising providing all the short access signals emitted by the subscriber stations to have the same time duration.

14. The method for accessing of transmission channels according to claim 13 further comprising subdividing the time intervals during which the subscriber stations can access with short access signals into call slots, the time duration of the call slots having a fixed ratio to the time duration of the short access signals.

15. The method for accessing of transmission channels according to claim 1 further comprising subdividing the duplex channel in each transmission direction into a sequence of time slots.

16. The method for accessing of transmission channels according to claim 1 further comprising incorporating the request for complete identification to a subscriber station, which has called with a short access signal, into any transmission emitted by the central base station.

17. The method for accessing of transmission channels according to claim 1 further comprising employing a burst error correcting code for the identification and for the further transmission, with which an error burst generated during the transmission by emitting of a short access signal can be corrected.

18. A system for establishing communication transmission between subscriber stations served by a central base station comprising
a duplex transmission channel;
a subscriber station emitting a short access signal, carrying call request information amounting to less than a complete identification of the subscriber station, to the central base station for initiating an information transmission of the subscriber station via the duplex transmission channel;

the central base station receiving the short access signal and responding with a request for complete identification of the subscriber station thereby initiating an information transmission from and to the subscriber station.

19. The system for establishing communication transmission according to claim 18 further comprising delay means for providing a delay for each transmission in the direction towards the central base station versus the information transmission in the direction towards the subscriber stations.

20. The system for establishing communication transmission according to claim 18 further comprising blocking means for subdividing the duplex transmission channel into time intervals permitted and time intervals blocked for free access by the subscriber stations.

21. The system for establishing communication transmission according to claim 18 further comprising marking means disposed at the central base station for emitting marking signals setting times with allowed access to the duplex transmission channel of short access signals coming from the subscriber stations.

* * * * *